US006457064B1

(12) United States Patent
Huff et al.

(10) Patent No.: US 6,457,064 B1
(45) Date of Patent: Sep. 24, 2002

(54) METHOD AND APPARATUS FOR DETECTING INPUT DIRECTED TO A THREAD IN A MULTI-THREADED PROCESS

(75) Inventors: Daryl A. Huff, Saratoga; William J. Yeager, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/067,546

(22) Filed: Apr. 27, 1998

(51) Int. Cl.[7] .................................................. G06F 9/54

(52) U.S. Cl. ..................................... 709/318; 709/100

(58) Field of Search ............................... 709/100–108, 709/310–400, 102, 104, 318

(56) References Cited

U.S. PATENT DOCUMENTS

| 5,179,702 | A | * | 1/1993 | Spix et al. .................. 709/102 |
| 5,247,675 | A | * | 9/1993 | Farrell et al. ............... 709/103 |
| 5,257,372 | A | * | 10/1993 | Furtney et al. ............. 709/105 |
| 5,287,508 | A | * | 2/1994 | Hejna, Jr. et al. .......... 709/102 |
| 5,305,455 | A | | 4/1994 | Anschuetz et al. ......... 709/100 |
| 5,339,415 | A | * | 8/1994 | Strout, II et al. ........... 709/102 |
| 5,355,488 | A | | 10/1994 | Cox et al. ................... 709/100 |
| 5,907,702 | A | * | 5/1999 | Flynn et al. ................ 709/108 |
| 5,933,627 | A | * | 8/1999 | Parady ....................... 712/228 |
| 6,052,708 | A | * | 4/2000 | Flynn et al. ................ 709/108 |
| 6,085,215 | A | * | 7/2000 | Ramakrishnan et al. .... 709/102 |

FOREIGN PATENT DOCUMENTS

| EP | 0 817 047 A2 | 1/1998 |
| EP | 0 817 047 A2 | 7/1998 |

OTHER PUBLICATIONS

Crispin, M., "Internet Message Access Protocol," *University of Washington*, (1996), pp. 1–93.

Lawrence, K.: *Writing Multithreaded Graphics Programs, The Developer Connection News*, vol. 7, Apr. 1995 (1995–04), pp. 16–17, XP002188186.

Kleiman, S., et al.: *Writing Multithreaded Code In Solaris, Intellectual Leverage.* San Francisco, Feb. 24–28, 1992, Proceedings of the Computer Society International Conference (COMPCON) Spring, Los Alamitos, IEEE Comp. Soc. Press, US, vol. Conf. 37, (Feb. 24, 1992), pp. 187–192, XP010027136.

(List continued on next page.)

Primary Examiner—St. John Courtenay, III
Assistant Examiner—Van H. Nguyen
(74) Attorney, Agent, or Firm—Beyer Weaver & Thomas LLP

(57) ABSTRACT

A method and apparatus are disclosed for handling an input event directed to a thread within a process operating in a multi-threaded system. A process is alerted that an input event effecting one of its active connection threads has been received. An input polling thread in the process is enabled and is used, in conjunction with other thread-specific data, to determine which of the threads in the process has an event directed to it. That thread is then triggered to handle the input event. The active connection thread receiving the input event is assigned a light weight process to execute only after it is determined that the thread requires it to process the input event. The input polling thread for a process detects input events for its process and causes the appropriate connection thread in the process to be assigned a light weight process when the connection thread needs it to execute. This greatly reduces the number of light weight processes assigned to threads in a multi-threaded operating system.

25 Claims, 4 Drawing Sheets

OTHER PUBLICATIONS

Evans, S.: *The Notifier*, USENIX Association Summer Conference Proceedings, Atlanta 1986, Jun. 9–13, 1986, pp. 344–354, XP002188187, E1 Cerrito, Calif. USA, USENIX Assoc., USA.

*Event–Raising Mechanism for Networking Architecture*, IBM Technical Disclosure Bulletin, IBM Corp., New York, US, vol. 39, No. 1, 1996, pp. 381–384, XP000556437, ISSN: 0018–8689.

INNOSOFT INTERNATIONAL: "PMDF System Manager's Guide—Chapter 11" PMDF DOCUMENTATION, 'Onfine!' No. PMDF–REF–5.1, Aug. 1997, pp. 1–17, XP002187544, Retrieved from the Internet: URL:http://ruls01.fsw.LeidenUniv.nl/{Versteegen/pmdf/DOC/HTML/sysman/book_b.html, retrieved on Jan. 16, 2002.

\* cited by examiner

METHOD AND APPARATUS FOR DETECTING INPUT DIRECTED TO A THREAD IN A MULTI-THREADED PROCESS

This application is related to U.S. Patent Application Nos. (not yet assigned). (Attorney Docket No. P2668/SUN1P169), filed on the same date herewith and commonly assigned, entitled "HIGH PERFORMANCE MESSAGE STORE," (Attorney Docket No. P2945/SUN1P192), filed on the same date herewith and commonly assigned, entitled "METHOD AND APPARATUS FOR HIGH PERFORMANCE ACCESS TO DATA IN A MESSAGE STORE", (Attorney Docket No. P3088/SUN1P194), filed on the same date herewith and commonly assigned, entitled "CRITICAL SIGNAL THREAD," which are incorporated herein by reference.

BACKGROUND OF THE INVENTION

1. Field of the Invention

The present invention relates generally to the field of computer software and client/server applications. In particular, it relates to directing data from clients to appropriate processes and threads in a multi-threaded operating system.

2. Discussion of Related Art

As network and distributed computing environments expand, the processing demands on operating systems running and supporting these environments increase. As networks grow, the number of users and the amount of data expand while expectations regarding response time and general operating system features increase with time. In some cases, while resources available in an operating system, especially those running in a distributed computing environment, may have been adequate for the number of users or volume of data initially contemplated for the network, these resources become increasingly valuable as the demands on the network grow. The volume of individual user requests grows while the operating system's pool of resources remains constant.

Two particular kinds of resources used by an operating system are generic processes and thread-execution enablers referred to in some operating systems as light weight processes. One type of generic process has its own pool of resources, such as memory, file descriptors, and stack routines. Existing within this type of process is, in most cases, a variety of threads, a thread being a piece of executable computer code designated to accomplish a specific and generally narrow task.

The types of threads contained in a process vary according to the function and overall requirements of the process and operating system. Behind each process and thread is a light weight process which enables the process or thread to execute by making system calls and performing input and output operations on behalf of the process or thread. For example, a light weight process allows a piece of code to make calls to the operating system. Thus, a thread or process effectively can not operate without being assigned a light weight process by the operating system. Typically, a light weight process is assigned to a thread when the thread makes a system call. However, an operating system normally has a limited number of light weight processes it can assign and this pool can be depleted if the number of processes and threads rapidly increases.

In some cases, a process, or threads within a process, may be waiting on an external event to occur or for input from an external source. For the process or thread to be "listening" for some type of external signal or data, it requires that it have a light weight process behind it. If the number of threads waiting for input or the number of processes running keeps growing, the more light weight processes the operating system will need to assign. When all the light weight processes have been assigned and a process P1 is ready to execute (and, thus, needs a light weight process), some operating systems perform context switching with another process, for example, P2. Context switching is a comparatively resource-intensive operation where the operating system to accommodate the needs of P1, saves the context of P2, restores the context of P1 and assigns to it the now available light weight process from P2. The system then allows P1 to run and, when it is complete or remains idle, restores the context of P2 and assigns the light weight process. This type of context switching (i.e. saving and restoring processes' contexts) for entire processes normally requires significant processing time and system resources and, thus, is undesirable. The concept of having threads within a process stemmed from the desire to reduce process context switching.

It is also undesirable to have each thread, especially in high-volume multi-threaded operating systems, assigned its own exclusive light weight process. This situation is particularly inefficient and wasteful given that, in many situations, threads are idle or in some type of input wait state most of the time, where they are not actively processing data or executing. In a high-volume network with thousands of users, the number of light weight processes can begin to run low. This problem is also true in smaller networks where the number of light weight processes available in the operating system may have been initially set to be relatively small. Even though starting and stopping a light weight process does not require significant overhead, it is very desirable for the operating system to always have them available when needed. Regardless of the size of the computing environment, threads can easily proliferate and consume valuable system resources, such as light weight processes.

Therefore, it would be desirable to have a mechanism that would decrease the number of light weight processes assigned to threads, particularly in the context where the threads require the light weight process solely to detect an external signal directed to that thread. It would be desirable for the operating system to assign a light weight process to a thread that requires the light weight process for execution only, thereby making more efficient use of the system's light weight processes and fostering overall savings in system resources.

SUMMARY OF THE INVENTION

To achieve the foregoing, and in accordance with the purpose of the present invention, methods, apparatus, and computer readable medium for handling an input event directed to a thread within a process operating in a multi-threaded system are disclosed. In one aspect of the present invention, a method is provided in which a process is alerted that an input event effecting one of its active connection threads has been received. A special thread referred to as an input polling thread in the process is enabled and is used, in conjunction with other thread-specific data, to determine which of the threads in the process has an event directed to it. That thread is then triggered to handle the input event.

In one embodiment an execution enabler, such as a light weight process, is assigned to the input polling thread and then run thereby enabling the input polling thread. In yet another embodiment, a list of threads maintained by a process is checked wherein each thread can be identified by a file descriptor and has an associated thread identifier, a thread wait variable, and an error return code. The state of a thread wait variable is changed when an input event directed to a thread associated with the thread wait variable is received.

In another aspect of the invention, a method of invoking a thread in a process when an input event is received and using a reduced number of light weight processes is disclosed. An input event directed at an active connection thread is received and a polling thread is used to determine which active connection thread the input event is directed to. A single light weight process is used by the appropriate active connection thread to handle the input event only such that the light weight process is assigned to the thread only after it is determined that the input event is directed to that thread. In one embodiment a conditional wait thread is run to monitor changes made to the active connection threads receiving an input event to ensure execution of those selected active connection threads.

In another aspect of the invention, a computer system configured to receive input from users where the input is directed to a specific thread contained in a process is disclosed. An input polling thread detects input events directed to active connection threads in the process and routes the event to the selected thread. Only the input polling thread requires a light weight process for detecting the input event thereby reducing the need for light weight processes used by the active connection threads, which would previously be needed for detecting input events. An input wait table associated with the process is structured for monitoring and storing information on the active connection threads where the information indicates which active connection threads are executing an input event. The input polling thread polls the input wait table to determine which active connection thread an input event is directed to thereby reducing the need for the active connection threads in the process to individually monitor input events.

In one embodiment of the present invention, a conditional wait thread monitors the input wait table to determine which selected active connection thread has had a state change. This ensures that the active connection thread with a state change is assigned a light weight process.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of reducing the number of light weight processes assigned by an operating system is illustrated in the various drawings. As described above, it is generally desirable for an operating system to have light weight processes available to be assigned to a generic process (e.g. a parent or child process), threads operating within or outside a process, jobs, and other executable entities operating in an operating system. Because the resources available to light weight processes in an operating system is limited, and the amount of resources is proportional to the size of the system, i.e., number of users, amount of data, etc., light weight processes will not have the resources they need to operate if there is significant growth on the system or if the system is not configured to make efficient use of its resources, regardless of the size of the computing environment. Once the pool of light weight processes no longer has resources it can draw from, overall performance of a computer network significantly deteriorates. For example, the operating system may have to perform context switching to accommodate the needs of processes, and users' requests, implemented by threads, must wait for light weight processes thereby slowing response time.

For example, in the described embodiment, a thread represents a client connection. Following this example, the client connection can be to a mail message store on a server in which the user wants to access mail messages. An active connection in this context represents a user session to a message store in a large network. In this environment, a parent process receives user requests to access a mail message store manages several child processes, each containing typically many active connection threads. This configuration of the described embodiment is shown in FIG. 1.

Figure 1:
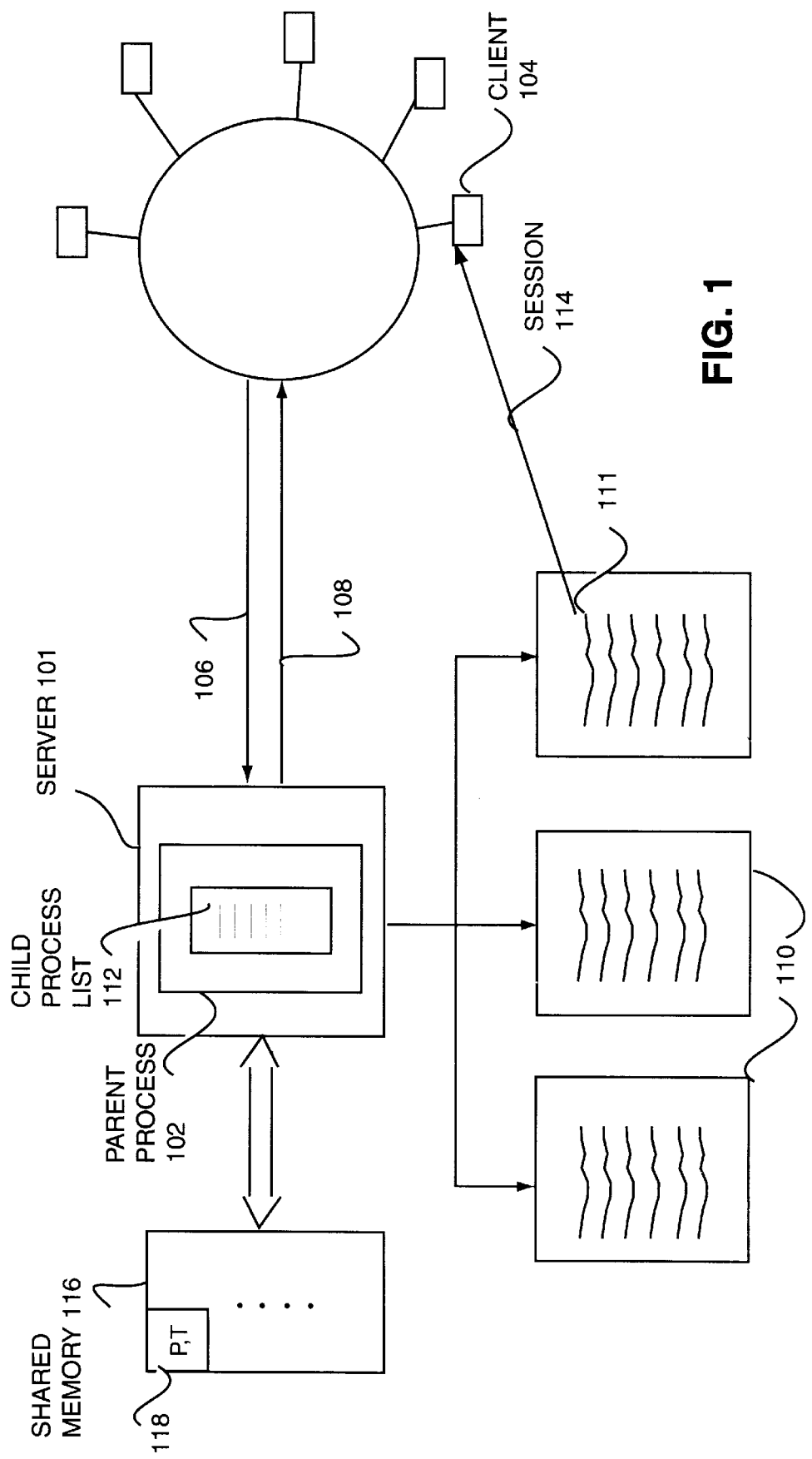
FIG. 1 is a block diagram showing various components of a message access configuration in accordance with one embodiment of the present invention.

FIG. 1 is a block diagram showing various components of a message access configuration and method in accordance with one embodiment of the present invention. In the described embodiment, the messages stored and accessed are Internet e-mail messages. An Internet Message (IM) access daemon 100 resides on a network mail server, such as an IMAP server which may also contain a message store. An example of an IMAP message store used to store messages and index information which may be used with the present invention is described in co-pending MESSAGE STORE application, the entire specification of which is incorporated herein by reference. A parent process 102 within daemon 100 is responsive to data (typically commands or requests to connect) sent from clients 104. Requests to connect 106 from clients are stored in a queue and are received by the server at a port depending on the protocol in which the request is being made. Once the server responds to a request 106, a connection 108 with a client is established and the client can begin sending data, such as commands for accessing and manipulating mail.

The parent process 102 has control of several concurrently operating child processes 110. It maintains a list of child processes 112 under its control. Each child process 110 has several threads of various types that can be in one of several states. In the described embodiment, there are 50 to 200 threads in each child process. Once a connection is established between a client and a server, a session is established between a thread and that client, shown at line 114.

In the described embodiment, a child process, a thread, and a connection associated with that thread each have a number or identifier. This information is stored in a shared memory 116, having a series of data cells 118, that can be read and updated by all child processes. The shared memory 116 is useful because typically child processes are not aware of each other's existence and cannot communicate. In other preferred embodiments, a shared memory may not be needed if child processes are able to communicate directly. In the described embodiment, as soon as a child process is created, shared memory cells 118 associated with that child process are allocated by the parent process. In other preferred embodiments the shared memory may be allocated by the child process itself or by other entities in the operating system.

Once a thread is created within a child process, a thread-specific data cell 118 is assigned to that thread. In the described embodiment, this shared memory 116 is created and pre-allocated by the parent process when the server is activated. In other preferred embodiments, the shared memory 116, if needed, can be created by other entities in the operating system. As mentioned, the shared memory is made up of a series of data cells. These cells 118 are identified by a coordinate "i" corresponding to a process and a coordinate "j" corresponding to a thread within that process. Thus, cell $(P_i, T_j)$ is a thread-specific data cell, which also contains a connection number "k," that allows one thread to inform other threads of its actions, such as updating a mailbox or copying messages from a mailbox. The thread-specific data cells 118 of the described embodiment in shared memory 116 allow a thread to inform all other threads under the same parent process of that thread's actions. Thus, the shared memory resides on the server and is pre-allocated and controlled by a parent process once the parent process is invoked.

In prior art systems, each active connection thread would have to have its own light weight process in order to detect any incoming input events directed to it. In a system having a high volume of users, all actively accessing mail and receiving new mail messages, the number of light weight processes can be quickly depleted or reach very low levels. This would result in users on the network not being able to access their mailboxes or not allowing new users to establish connections to the message store. Both these events are highly undesirable given the high performance standards users now expect from e-mail system.

Figure 2:
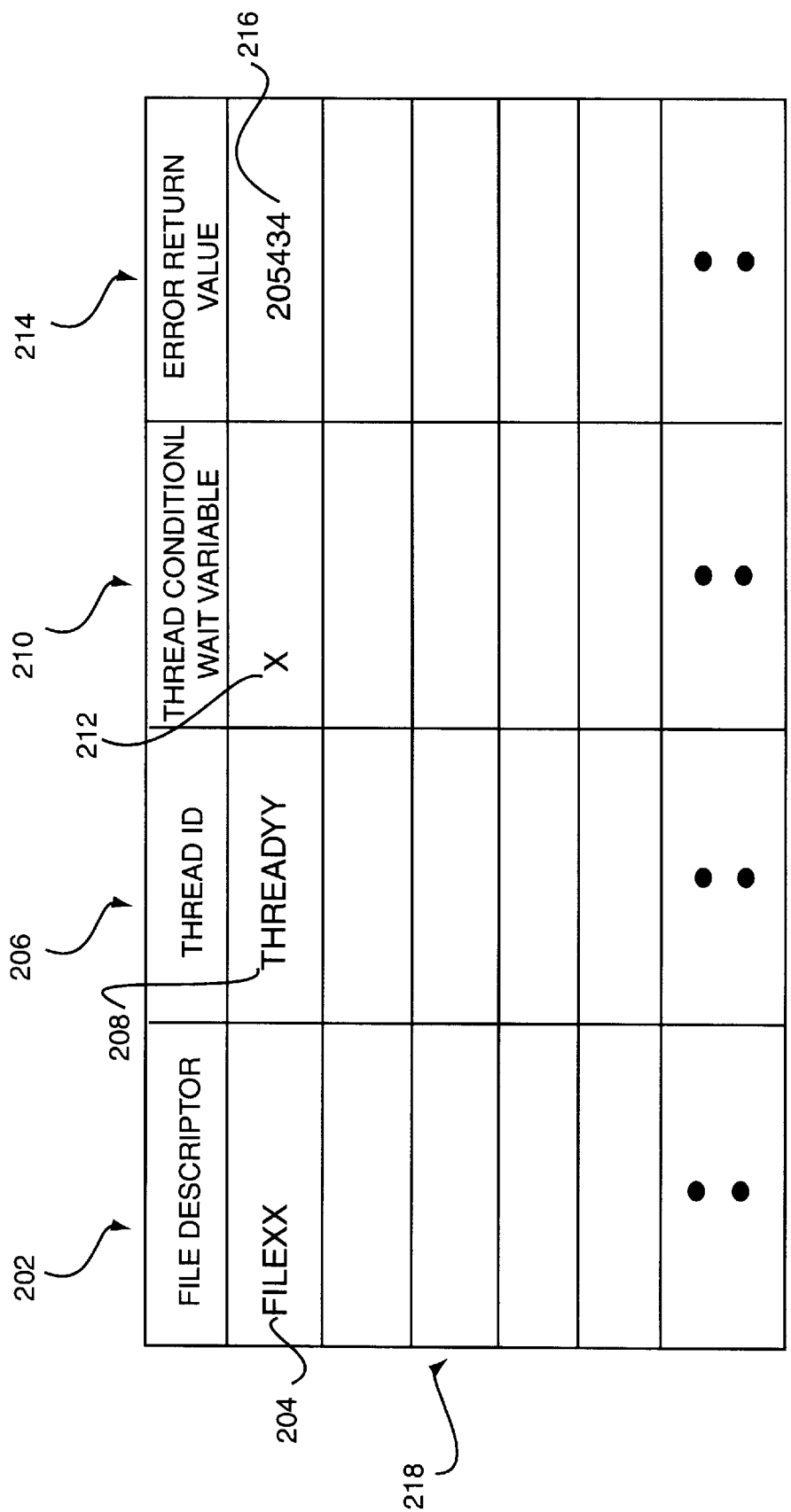
FIG. 2 is an illustration of an input wait table associated with a process in accordance with one embodiment of the present invention.

FIG. 2 is an illustration of an input wait table associated with a process in accordance with one embodiment of the present invention. Beginning at the top layer of the method of the described embodiment, the operating system receives an input event. This is generally some type of activity generated by a user or some external source, such as another computer network. In the present invention, the operating system is suited for a distributed computing environment. By way of example, an operating system suitable for use in the present invention can be a Unix-based operating system such as the Solaris™ operating system of Sun Microsystems, Inc. or a DOS-based operating system such as the Windows NT™ operating system of Microsoft Corp. The input event can be a normal user request, such as checking for new mail or sending a request to print a document, or it can be a less frequent event such as an interrupt signal. Regardless, the input event is normally directed generally to process and specifically to a thread. A method in accordance with one embodiment of the present invention is described fully with regard to FIG. 2. In the preferred embodiments, one table can hold information on more than one process. The table shown in FIG. 2, referred to in the discussion of FIG. 2, is associated generally with a process within the operating system, which contains different types of threads. In addition to being a network-based operating system, the operating system of the present invention is a multi-threaded operating system. A process having threads representing connections to users (or external entities) has an associated input wait table for monitoring and routing input events to an event's corresponding thread or threads. It is possible that in the described embodiment a process can have only one thread or no threads.

In a typical connection, a thread is generally waiting for input or some type of activity to occur the majority of the time the thread is in existence. In the described embodiment, the input wait table for a process stores information on which connections, i.e., threads, are in a wait state and which are executing or processing an input event. In the described embodiment, the operating system assigns to the process a light weight process for maintaining the process's input wait table. The operating system of the described embodiment schedules light weight processes which include assigning them to threads when a thread needs one (e.g. when a thread makes a call to the operating system or performs an I/O operation). One type of light weight process can be described as an execution enabler that allows a thread to execute. In other preferred embodiments, an operating system may use another type of execution enabler similar to a light weight process, of which there is a limited number available in the system and should be assigned prudently and efficiently. The thread associated with the input wait table invokes a special thread referred to as a polling thread when an input event is received. The polling thread polls or scans the table to determine which connection or connections the input event is directed to and changes the state of the connection from the wait state to a state indicating that it has received input that needs to be processed. It should be noted that the input wait table of the described embodiment may be implemented using other data constructs such as a queue or a linked list. In these embodiments, the polling thread would still have the same function of checking each entry in the data structure for determining which ones have received an input event. Similarly, the receipt of an input event can be manifested in various ways in other preferred embodiments using, by way of example, semaphores, flags, or other types of variables. The polling thread has a single execution enabler assigned to it, which in the described embodiment is a light weight process. As will be discussed in greater detail below, this greatly reduces the need for each connection to have assigned its own light weight process. Once the polling thread has scanned the table and changed the state of the appropriate connections, a conditional wait thread that monitors changes to connection entries in the table is responsible for having any altered connections assigned a light weight process or execution enabler of some sort thereby enabling that now active connection to execute.

Referring now to FIG. 2, an input wait table 200 of the described embodiment includes a file descriptor column 202 for holding file descriptors 204 representing connections, a thread identifier column 206 for holding thread identifiers 208, a conditional wait variable column 210 for holding wait indicators 212, and a error return column 214 for holding error return values 216. In other preferred embodiments, an input wait table may have more columns or fewer columns as appropriate without altering the primary function of the table. As mentioned above, in other preferred embodiments, a process may use a data structure other than a table for storing data on its connections or threads and remain within the scope of the present invention. In the described embodiment, a connection is represented by a row 218 in table 200.

In the described embodiment, a file descriptor 204 represents a connection of a particular process. When a new connection is associated with a process, it is represented in the process by a file descriptor since, in the context of a process, a connection is essentially a file. Thus, each connection within a process is represented by a file descriptor. In the described embodiment, when a connection is taken from the wait state to an execution (or "GO") state, and then returns to a wait state, it keeps the same file descriptor but has a new entry in the input wait table. In other preferred embodiments, the connection can keep the same file descriptor as well as the same row in the input wait table, and not need to initialize a new entry in the table.

Thread identifier 208 is a unique value that identifies a thread and is different from the thread's file descriptor. The thread identifier 208 is used in connection with posting a thread semaphore or thread conditional wait variable 212. In the described embodiment, the thread conditional wait variable 212 is a flag that indicates whether the thread is in an input wait state or execution state. A polling thread scans the table to determine which thread or threads have input events directed to them and sets variable 212 to "GO." Another thread or light weight process then starts that thread. Thus, wait variable 212 is a thread-specific flag used to indicate the state of a thread. The error return value 216 is used to store any error conditions encountered by the thread. In other preferred embodiments, the input wait table can have additional or fewer columns or fields depending on the particular platform in which the process is running or other system and application requirements. Furthermore, in other preferred embodiments, a process can use another type of data structure to store data regarding threads allowing a polling thread represented by a single light weight process, or similar execution enabler, to manage input events and thread execution.

Figure 3:
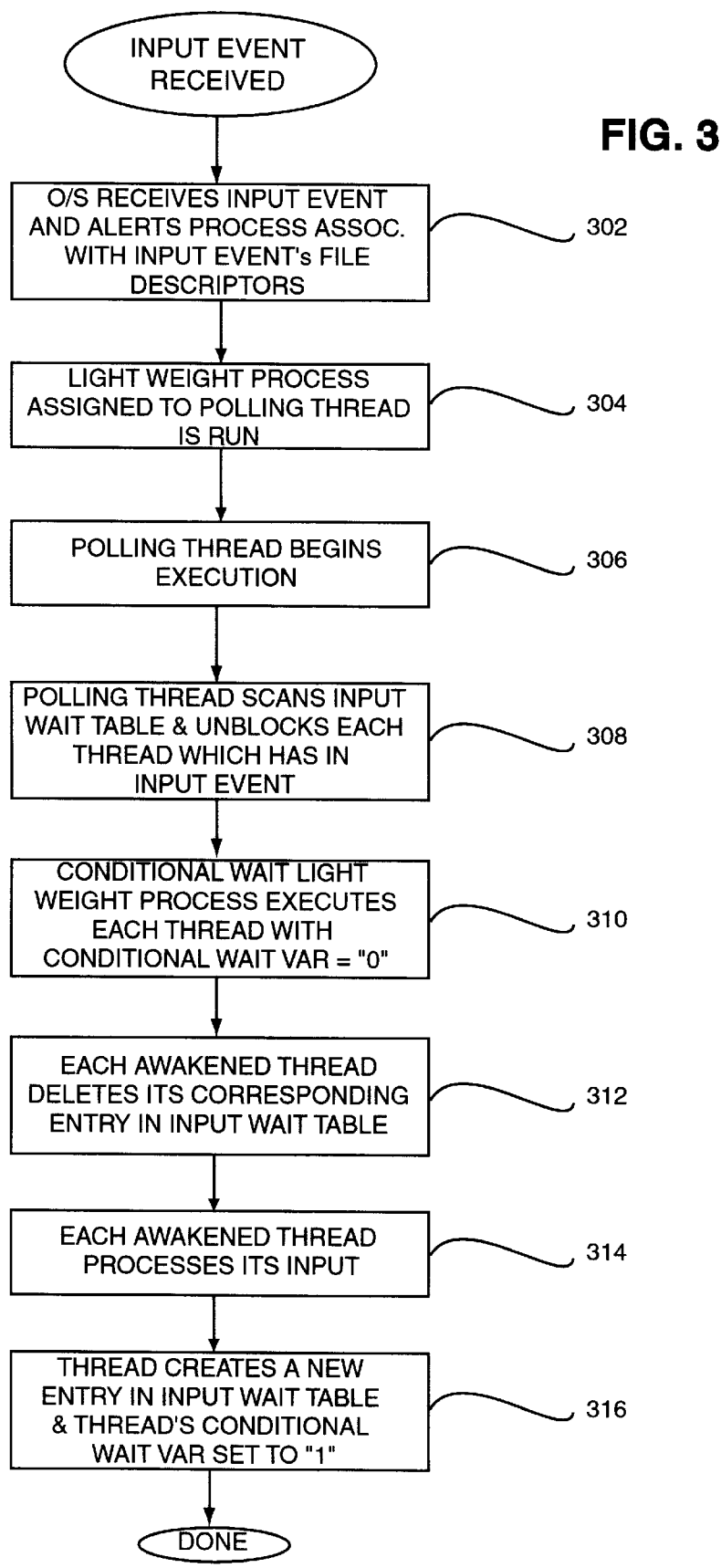
FIG. 3 is a flowchart showing a method of executing a connection thread in response to a received input event in accordance with one embodiment of the present invention.

An input wait table as described above with respect to FIG. 2 is used in a method of receiving an input event and executing the appropriate connection thread while reducing consumption of light weight processes. FIG. 3 is a flowchart showing a method of executing a connection thread in response to a received input event in accordance with one embodiment of the present invention. At step 302 the operating system detects an input event or some type of activity, for example a user request or a system interrupt. This input event is typically directed to a connection, represented by an active connection thread in a process. The operating system alerts the process containing the active connection thread, where the active connection thread is represented by a file descriptor. In the described embodiment, the system uses the file descriptor associated with the input event to determine which process to alert. As discussed with respect to the file descriptor column 302 of FIG. 3, each thread is represented and identified in the operating system and in the input wait table by a file descriptor 204.

At step 302 the light weight process associated with the process's polling thread is placed in a RUN state. This occurs when a process is alerted that one of its threads has an input event. The polling thread has a light weight process assigned to it but is asleep until its process is alerted, at which point the polling thread is awakened. At step 304 the polling thread begins execution. In the described embodiment, a light weight process allows a connection thread to execute by allowing it to perform necessary functions, such as making system calls or performing input/output operations.

At step 308 the polling thread scans the input wait table to determine which file descriptors, or threads, have an input event. In the described embodiment, it unblocks those file descriptors that have an event by changing the state of the thread's conditional wait variable 212. In the described embodiment this is done by signaling the conditional wait variable to "1" if there is an input event and leaving the thread unaltered if there is no input event for the thread. In the described embodiment, a thread is placed in an input wait state by calling an operating system function called WaitForInput which sets the conditional wait variable 212 to "0" and waits on the conditional wait variable. In other preferred embodiments, the thread or process can call other routines or have other procedures for placing a thread in a wait state by, for example, setting a semaphore or flag.

At step 310 a conditional wait thread in the process that oversees the connection threads to detect which connection threads have had state changes ensures that those threads are assigned light weight processes so they can execute. In the described embodiment, this "conditional wait" light weight process checks to see what the polling thread has done to the connection threads and behaves accordingly. At step 312 of the described embodiment, the thread deletes its entry in the input wait table before it proceeds to process the input event. At step 314 each awakened thread processes its input event or activity, which it can now do since it has been assigned a light weight process. Once the thread has processed the input event, the thread initializes a new entry in the input wait table to indicate its return to the input wait state. In the described embodiment, the conditional wait variable is set to "0" by calling a WaitForInput function and waiting on the conditional wait variable. In other preferred embodiments, the thread can use the same entry it had previously occupied in the input wait table without initializing a new one when it is done processing the input event. Whether the table is static in which rows are reused or dynamic in which new rows are initialized does not effect the underlying functionality and purpose of the input wait table.

Once a new entry for the thread in the input wait table has been initialized, the light weight process allowing execution of the thread is released from that thread. The conditional wait thread mentioned above can then reassign the light weight process to another thread or return it to the pool of light weight processes in the operating system. By releasing the light weight process from the thread when the thread is done executing, the system realizes benefits of the polling thread. In previous systems, the light weight process would remain with the thread even when the thread was idle or waiting for input. In the present invention, the polling thread using the input wait table and working in conjunction with the "conditional wait" thread, greatly reduces the consumption of light weight processes by connection threads by allowing them to be assigned to threads only when needed.

As described above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 4:
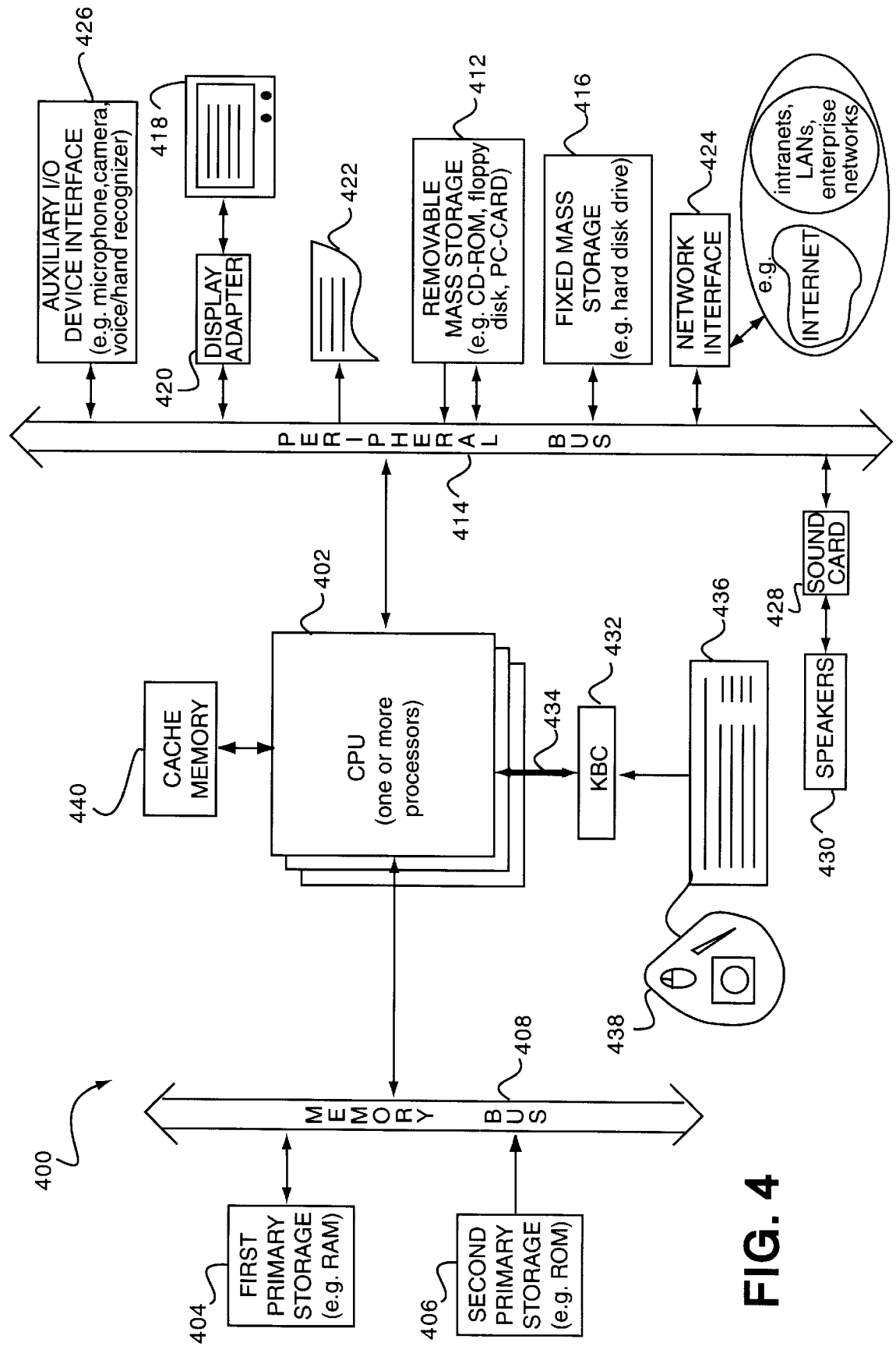
FIG. 4 is a block diagram of a typical computer system suitable for implementing an embodiment of the present invention.

FIG. 4 is a block diagram of a general purpose computer system 400 suitable for carrying out the processing in accordance with one embodiment of the present invention. FIG. 4 illustrates one embodiment of a general purpose computer system. Other computer system architectures and configurations can be used for carrying out the processing of the present invention. Computer system 400, made up of various subsystems described below, includes at least one microprocessor subsystem (also referred to as a central processing unit, or CPU) 402. That is, CPU 402 can be implemented by a single-chip processor or by multiple processors. CPU 402 is a general purpose digital processor which controls the operation of the computer system 400. Using instructions retrieved from memory, the CPU 402 controls the reception and manipulation of input data, and the output and display of data on output devices.

CPU 402 is coupled bi-directionally with a first primary storage 404, typically a random access memory (RAM), and uni-directionally with a second primary storage area 406, typically a read-only memory (ROM), via a memory bus 408. As is well known in the art, primary storage 404 can be used as a general storage area and as scratch-pad memory, and can also be used to store input data and processed data. It can also store programming instructions and data, in the form of threads and processes, for example, in addition to other data and instructions for processes operating on CPU 402, and is used typically used for fast transfer of data and instructions in a bi-directional manner over the memory bus 408. Also as well known in the art, primary storage 406 typically includes basic operating instructions, program code, data and objects used by the CPU 402 to perform its functions. Primary storage devices 404 and 406 may include any suitable computer-readable storage media, described below, depending on whether, for example, data access needs to be bi-directional or uni-directional. CPU 402 can also directly and very rapidly retrieve and store frequently needed data in a cache memory 430.

A removable mass storage device 412 provides additional data storage capacity for the computer system 400, and is coupled either bi-directionally or uni-directionally to CPU 402 via a peripheral bus 414. For example, a specific removable mass storage device commonly known as a CD-ROM typically passes data uni-directionally to the CPU 402, whereas a floppy disk can pass data bi-directionally to the CPU 402. Storage 412 may also include computer-readable media such as magnetic tape, flash memory, signals embodied on a carrier wave, PC-CARDS, portable mass storage devices, holographic storage devices, and other storage devices. A fixed mass storage 416 also provides additional data storage capacity and is coupled bi-directionally to CPU 402 via peripheral bus 414. The most common example of mass storage 416 is a hard disk drive. Generally, access to these media is slower than access to primary storages 404 and 406. Mass storage 412 and 416 generally store additional programming instructions, data, and the like that typically are not in active use by the CPU 402. It will be appreciated that the information retained within mass storage 412 and 416 may be incorporated, if needed, in standard fashion as part of primary storage 404 (e.g. RAM) as virtual memory.

In addition to providing CPU 402 access to storage subsystems, the peripheral bus 414 is used to provide access other subsystems and devices as well. In the described embodiment, these include a display monitor 418 and adapter 420, a printer device 422, a network interface 424, an auxiliary input/output device interface 426, a sound card 428 and speakers 430, and other subsystems as needed.

The network interface 424 allows CPU 402 to be coupled to another computer, computer network, or telecommunications network using a network connection as shown. Through the network interface 424, it is contemplated that the CPU 402 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 402 can be used to connect the computer system 400 to an external network and transfer data according to standard protocols. That is, method embodiments of the present invention may execute solely upon CPU 402, or may be performed across a network such as the Internet, intranet networks, or local area networks, in conjunction with a remote CPU that shares a portion of the processing. Additional mass storage devices (not shown) may also be connected to CPU 402 through network interface 424.

Auxiliary I/O device interface 426 represents general and customized interfaces that allow the CPU 402 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 402 is a keyboard controller 432 via a local bus 434 for receiving input from a keyboard 436 or a pointer device 438, and sending decoded symbols from the keyboard 436 or pointer device 438 to the CPU 402. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 408, peripheral bus 414, and local bus 434 are illustrative of any interconnection scheme serving to link the subsystems. For example, a local bus could be used to connect the CPU to fixed mass storage 416 and display adapter 420. The computer system shown in FIG. 4 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For instance, the input wait table can contain information on threads in more than one table by having an additional process identifier column. In another example, the input wait table can have more or fewer columns as needed by the system. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of handling an input event to a multi-threaded process that includes a plurality of active connection threads, the method comprising:

alerting the multi-threaded process that the input event effecting a selected one of the active connection threads has been received;

enabling a polling thread contained in the multi-threaded process;

determining the selected one of the active connection threads contained in the multi-threaded process to which the input event is directed using the polling thread operable to scan an input wait table of the active connection threads indicating status corresponding to the active connection threads; and triggering the selected one of the active connection threads to handle the input event.

2. A method as recited in claim 1 wherein enabling a polling thread further includes assigning an execution enabler to the polling thread and running the execution enabler.

3. A method as recited in claim 2 wherein the execution enabler is a light weight process.

4. A method as recited in claim 1 wherein determining the active connection thread further includes:

checking the list of the active connection threads maintained by the process wherein each thread can be identified by a file descriptor and wherein the list of threads includes for each thread the file descriptor, a thread identifier, a thread wait variable, and an error return code.

5. A method as recited in claim 4 further including changing the state of the thread wait variable when there is an input event directed to a thread associated with the thread wait variable.

6. A method as recited in claim 4 further including enabling a conditional wait thread for monitoring changes to the active connection threads in the list.

7. A method of invoking a thread in a process when the process receives an event directed to the thread, the method comprising:

alerting the process, the process having a plurality of threads and associated thread-specific data, that an input event effecting one such thread contained in the process has been received;

enabling a polling thread contained in the process;

determining which thread contained in the process to which the input event is directed using the polling thread operable to scan an input wait table of the plurality of threads indicating status corresponding to the plurality of threads; and triggering each of the threads in the plurality of threads which has the input event to process that event.

8. A method of handling an input event to a multi-threaded process that includes a plurality of active connection threads, the method comprising:

receiving an input event directed at a selected one of the active connection threads;

using a polling thread associated with the plurality of the active connection threads to determine which of the plurality of active connection threads the input event is directed to by scanning an input wait table of the active connection threads indicating status corresponding to the active connection threads; and triggering the selected active connection thread to handle the input event, thereby assigning a light weight process to the selected active connection thread to facilitate execution of the selected active connection thread, whereby each active connection thread does not require a dedicated light weight process to facilitate the detection of the input event that is directed to the selected active connection thread, thereby reducing consumption of light weight processes within the multi-threaded process.

9. A method as recited in claim 8 further including running a conditional wait thread to monitor changes made to the plurality of active connection threads having an input event to ensure execution of the selected active connection thread.

10. A computer system having a multi-threaded process capable of receiving an input event from a user directed to a selected one of active connection threads contained in the process, the system comprising:

an input polling thread arranged to detect the input event directed to the selected one of the active connection threads in the multi-threaded process and to route the input event to the selected thread whereby only the input polling thread requires a light weight process to detect the input event thereby reducing consumption of light weight processes by the active connection threads used for detecting input events; and an input wait table associated with the process and structured for monitoring and storing information on the active connection threads, such information indicating which one of the active connection threads is executing the input event;

whereby the input polling thread polls the input wait table to determine which active connection thread the input event is directed to thereby reducing the need for the active connection threads in the process to individually monitor input events thereby lowering the number of light weight processes running in the computer system.

11. A computer system as recited in claim 10 further comprising a conditional wait thread for monitoring the input wait table to determine which selected one of the active connection threads has had a state change thereby ensuring that the selected one of the active connection threads is assigned to a light weight process.

12. A computer system having a multi-threaded process capable of receiving an input event from a user directed to a selected one of active connection threads contained in the process, the system comprising:

a means for detecting the input event directed to the selected one of the active connection threads in the multi-threaded process and to route the input event to the selected thread whereby only the means for detecting requires a light weight process to detect the input event thereby reducing consumption of light weight processes by the active connection threads used for detecting input events; and a means for monitoring and storing information on the active connection threads, such information indicating which one of the active connection threads is executing the input event;

whereby the means for detecting polls the means for monitoring and storing to determine which active connection thread the input event is directed to thereby reducing the need for the active connection threads in the process to individually monitor input events thereby lowering the number of light weight processes running in the computer system.

13. A computer system as recited in claim 12 further comprising a means for monitoring the input wait table to determine which selected one of the active connection threads has had a state change thereby ensuring that the selected one of the active connection threads is assigned to a light weight process.

14. A computer-readable medium containing programming instructions for handling an input event to a multi-threaded process that includes a plurality of active connection threads, the computer-readable medium comprising computer program code devices configured to cause a computer to execute the steps of:

alerting the process that the input event effecting a selected one of the active connection threads has been received;

enabling a polling thread contained in the process;

determining which of the active connection threads contained in the process has the event directed to it using the polling thread operable to scan an input wait table of the active connection threads indicating status corresponding to the active connection threads; and triggering the selected active connection thread to handle the input event.

15. A computer-readable medium as recited in claim 14 further including computer program code devices configured for changing a state of a thread wait variable when there is the input event directed to a thread associated with the thread wait variable.

16. A computer-readable medium as recited in claim 14 further including computer program code devices configured for enabling a conditional wait thread for monitoring changes to active connection threads in the list.

17. A computer-readable medium as recited in claim 14 wherein the computer program code devices configured to cause a computer to enable a polling thread further includes computer program code devices configured to cause a computer to execute the step of enabling a polling thread further includes assigning an execution enabler to the polling thread and running the execution enabler.

18. A computer-readable medium as recited in claim 14 wherein the computer program code devices configured to cause a computer to determine which of the active connection threads contained in the process has an event directed to it further includes computer program code devices configured to cause a computer to execute the step of checking a list of threads maintained by the process wherein each thread can be identified by a file descriptor and wherein the list of threads includes for each thread the file descriptor, a thread identifier, a thread wait variable, and an error return code.

19. A computer system configured to receive input events from a plurality of users directed to a specific active connection thread contained in a multi-threaded process that includes a plurality of active connection threads, the system comprising:

a means for alerting the multi-threaded process that an input event effecting a selected one of the active connection threads has been received;

a means for enabling a polling thread contained in the process;

a means for determining which of the active connection threads contained in the process has the input event directed to it using the polling thread operable to scan an input wait table of the active connection threads indicating status corresponding to the active connection threads; and a means for triggering the selected active connection thread to handle the input event.

20. A computer-readable medium containing programming instructions for invoking a thread in a process when the process receives an event directed to the thread, the computer-readable medium comprising computer program code devices configured to cause a computer to execute the steps of:

alerting the process, the process having a plurality of threads and associated thread-specific data, that an input event effecting a thread contained in the process has been received;

enabling a polling thread contained in the process;

determining which of the threads contained in the process has the input event directed to it using the polling thread operable to scan an input wait table of the plurality of the threads indicating status corresponding to the plurality of the threads; and triggering each of the threads in the plurality of threads which has the input event to process that event.

21. A computer-readable medium containing programming instructions for handling an input event to a multi-threaded process that includes a plurality of active connection threads, the computer-readable medium comprising computer program code devices configured to cause a computer to execute the steps of:

receiving an input event directed at a selected one of the active connection threads;

using a polling thread associated with the plurality of the active connections threads to determine which one of the plurality of active connection threads the input event is directed to by scanning an input wait table of the active connection threads indicating status corresponding to the active connection threads; and triggering the selected active connection thread to handle the input event, thereby assigning a light weight process to the selected active connection thread to facilitate execution of the selected active connection thread, whereby each active connection thread does not require a dedicated light weight process to facilitate the detection of the input event that is directed to the selected one of the active connection threads, thereby reducing consumption of light weight processes within the multi-threaded process.

22. A computer-readable medium as recited in claim 21 further including computer program code devices configured for running a conditional wait thread to monitor changes made to the plurality of active connection threads having an input event to ensure execution of the selected active connection thread.

23. A computer system configured to receive input events from a plurality of users directed to a specific active connection thread contained in a process, the system comprising:

a means for receiving an input event directed at a selected one of the active connection threads;

a means for using a polling thread associated with the plurality of the active connections threads to determine which one of the plurality of active connection threads the input event is directed to by scanning an input wait table of the active connection threads indicating status corresponding to the active connection threads; and a means for triggering the selected active connection thread to handle the input event, thereby assigning a light weight process to the selected active connection thread to facilitate execution of the selected active connection thread, whereby each active connection thread does not require a dedicated light weight process to facilitate the detection of the input event that is directed to the selected one of the active connection threads, thereby reducing consumption of light weight processes within the multi-threaded process.

24. A computer system as recited in claim 23 further comprising a means for running a conditional wait thread to monitor changes made to the plurality of active connection threads having an input event to ensure execution of the selected active connection thread.

25. A computer system configured to receive input events from a plurality of users directed to a specific active connection thread contained in a process, the system comprising:

a means for alerting the process, the process having a plurality of threads and associated thread-specific data, that an input event effecting a thread contained in the process has been received;

a means for enabling a polling thread contained in the process;

a means for determining which of the threads contained in the process has the input event directed to it using the polling thread operable to scan an input wait table of the plurality of the threads indicating status corresponding to the plurality of the threads; and a means for triggering each of the threads in the plurality of threads which has the input event to process that event.

\* \* \* \* \*